(12) United States Patent
Tupper

(10) Patent No.: US 11,903,480 B2
(45) Date of Patent: Feb. 20, 2024

(54) PRUNER SCRUBBER ROTOR ASSEMBLY

(71) Applicant: Robert R Tupper, The Dalles, OR (US)

(72) Inventor: Robert R Tupper, The Dalles, OR (US)

( * ) Notice: Subject to any disclaimer, the term of this patent is extended or adjusted under 35 U.S.C. 154(b) by 635 days.

(21) Appl. No.: 17/067,438

(22) Filed: Oct. 9, 2020

(65) Prior Publication Data

US 2022/0110441 A1    Apr. 14, 2022

(51) Int. Cl.
  *A46B 13/00* (2006.01)
  *A46B 3/16* (2006.01)
  *A46B 13/02* (2006.01)

(52) U.S. Cl.
  CPC .............. *A46B 13/008* (2013.01); *A46B 3/16* (2013.01); *A46B 13/006* (2013.01); *A46B 13/02* (2013.01); *A46B 2200/3073* (2013.01)

(58) Field of Classification Search
  CPC ..... A46B 13/008; A46B 13/02; A46B 13/001; A46B 13/006
  See application file for complete search history.

(56) References Cited

U.S. PATENT DOCUMENTS

| | | | | |
|---|---|---|---|---|
| 2,472,155 A | * | 6/1949 | Gaino | A47L 4/00 15/180 |
| 2,932,051 A | * | 4/1960 | Joseph, V | A46B 13/006 15/182 |
| 6,145,147 A | * | 11/2000 | Frecska | B08B 3/04 15/88.2 |
| 10,293,382 B2 | * | 5/2019 | Timoney | B08B 1/00 |
| 10,786,833 B2 | * | 9/2020 | Tupper | A46B 9/025 |
| 2019/0254237 A1 | * | 8/2019 | Tupper | B08B 1/002 |

\* cited by examiner

*Primary Examiner* — Laura C Guidotti

(57) ABSTRACT

Pruning plants that exude sticky sap may leave pruners gummed up and barely useable. Cleaning edged cutting tools presents injury risks to nursery and farm workers, so a need for rapid and effective cleaning machines exists. This pruner cleaning machine includes a motorized rotor assembly of scrubber discs facing each other and a helical center brush disposed between them. The scrubber discs include helical ramps and step faces at the ends of these ramps which conform to the ends of the helical scrubber, so that the spacing between the scrubber discs may be accurately controlled by the number of turns of the helical scrubber, including partial turns. The rotor may be reconfigured for various types of pruners by selecting from among various lengths of helical scrubbers. Properly configured, by using this machine and its inventive scrubbing rotor, gummed up pruners may be cleaned in seconds.

26 Claims, 11 Drawing Sheets

PRUNER SCRUBBER ROTOR ASSEMBLY

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to a rotor assembly of scrubbing elements for cleaning pruner blades

BACKGROUND

Many types of plants have thick, viscous, or gummy sap or resin in their stalks and other parts, and when trimming, pruning, or harvesting, the shearing or cutting tools used often accumulate sticky residues which can in turn pick up other foreign matter such as dust, fines, or clippings. Over time the tool becomes increasingly difficult to use or to control safely, halting the work while the tool is cleaned. Currently there are a number of methods used to attempt to clean off sticky residue from shears, pruners, or gardening scissors. One of set of methods involves soaking a fouled tool or at least the cutting blades or edges of the tool in a cleaning solution, or oil impregnated sand, or other sorts and mixtures of solvents or abrasives, but these methods fail to satisfy market needs because of how long the trimmers need to be soaked or cycled within the cleaning medium, and the additional steps required to remove gritty abrasive cleaners before returning the tool to service.

Attempts to sharpen gummed up plant trimming shears are often inadequate because although sharpening may remove gummy residue and foreign matter from the immediate area of the tool's cutting surfaces, the rest of the tool will remain substantially fouled. Worse, gummy residues transferred to the sharpening tool will impede subsequent sharpening attempts. Eventually both the cutting tools and the sharpening tools alike will still need to be cleaned.

Working on resinous plants with cutting or pruning tools requires more frequent instances of cleaning and sharpening the tools, and it is often attempted to devise portable cleaning and sharpening tools which can be worn by a gardener or field worker or kept close by a site where pruning, cutting, or harvesting is in progress.

Cleaning scissors by hand usually requires rags, open containers of solvents, and presents uses with cutting hazards. Contaminated rags may contribute to impurities in valuable products. Where cleaning solvents are used, evaporation, odors, ventilation contribute additional challenges and opportunities for hazards and waste, and users may be exposed to undesired contact with these cleaning agents and plant materials or their extracts suspended therein in the event of a spill or a leak.

Where purity of plant extracts is an objective, contamination becomes a concern because a used rag can transfer contaminants or fine matter between supposedly clean tools. When harvesting plants for medical compounds, people who clean the cutting tools risk receiving a transfer of active agents in plant oils into the body, which can precipitate allergic reactions or an unintended dose of psychotropic medicinal compounds, or unwanted hormonal responses to chemicals intended to alleviate medical conditions not present in an affected user.

In summary, improvements in machinery for cleaning gummed up plant pruners are in constant and current demand.

BRIEF DESCRIPTION

From the aforementioned background it is understood that many objectives exist for a device for cleaning pruners, clippers, shears, or other gardening or harvesting tools used with plants that exude any sort of viscous, sticky saps or resins likely to gum up the mechanical workings of such a cutting tool.

Thus, a primary objective of the invention is to provide an apparatus that scrubs plant trimming shears and removes residues from blades rather than having them transferred into a rag which can then contaminate other tools.

A corollary objective of the invention is to provide motive power to moving parts of scrubbing and blade cleaning components and mechanisms of the invention. Another corollary objective of the invention is to ensure scrubbing materials contact and clean most if not all shearing surfaces of an inserted pruning tool. Another corollary objective of the invention is to provide scrubbing motions and durations in regimens which effectively clean the inserted tool.

Yet another objective of the invention is to provide an effective cleaning and scrubbing mechanism which is robust and able to withstand accidental and some intentional misuse, and further corollary objectives of the invention are that the machinery is mechanically simple and that the components may be produced at modest cost.

Another objective of the invention is to present a cleaning solution or solvent to fouled portions of the tool or at least the cutting surfaces thereof. A corollary objective of the invention is to separate unwanted, gummy residue from cutting surfaces and mechanisms of the cutting tool, by mechanical actions or chemical actions or both.

Another objective of the invention is to reduce or prevent loss or spillage of cleaning solution retained in a reservoir within the tool cleaning device. A corollary objective of the invention is to retain the cleaning fluid for collection so that certain plant oils diffused into the solution may be extracted and concentrated as a valuable derivative product.

Another objective of the invention is to protect the user from contact with any mechanisms or components of the device which may present an opportunity for injury or damage such as pinching hazards, exposed surfaces or edges of sharpening tools especially while in motion, or powered reciprocating or rotating machinery that may catch and wind up clothing or other foreign objects. A corollary objective for the safe operation of the machine is to provide one or more weak links in its drive train so that if by misuse or accident the rotor is halted suddenly the weak link will fail and prevent damage to the motor or other rotary mechanisms. A weak link may also prevent operator injury by disconnecting the scrubbing rotor assembly from the drive mechanism in the event that clothing, hair, or other foreign matter becomes entrained into the rotating parts.

A further objective of the invention is to provide a machine having portions which are easy to disassemble so as to allow access for exchanging scrubbing components when these become worn, reconfiguring brushes or discs of various bristle configurations or degrees of abrasiveness, or adjusting the spacing between scrubbing components for pruners having various blade configurations. A corollary objective is to provide internal cowlings or shrouds which are difficult or non-intuitive to remove, so as to protect precision, factory adjusted mechanisms, circuit boards, and high energy wiring from unauthorized meddling.

Various devices are currently available which attempt to address these challenges, although they may at best meet only one or two aspects of the totality of the requirements.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sublabel, it is intended to refer to all such multiple similar components.

FIG. 6b is an exploded view of the components of the scrubber disc assembly shown in FIG. 6a.

FIG. 6c is a partially broken view of a spindle for the scrubber disc assembly of FIG. 6a.

FIG. 14a shows a top right front view of a pruner scrubbing machine in accordance with the invention.

FIG. 14b shows a top left front view of the pruner scrubbing machine of FIG. 14a.

FIG. 14c shows a front elevation view of the pruner scrubbing machine of FIG. 14a.

FIG. 14d shows a right elevation view of the pruner scrubbing machine of FIG. 14a.

FIG. 14e shows a left elevation view of the pruner scrubbing machine of FIG. 14a.

FIG. 14f shows a top view of the pruner scrubbing machine of FIG. 14a.

DETAILED DESCRIPTION OF CERTAIN EMBODIMENTS

Figure 1:
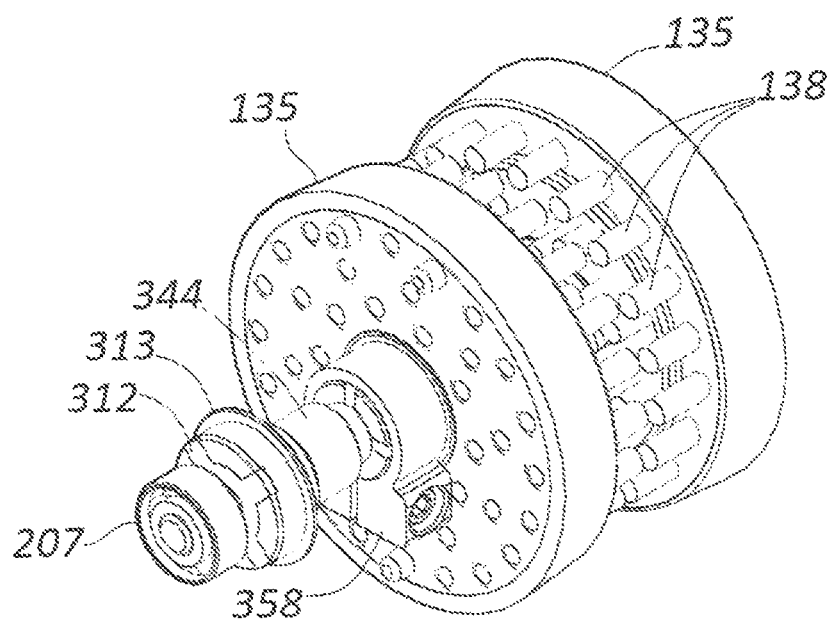
FIG. 1 shows an embodiment of a second shaft of a pruner scrubber rotor assembly in accordance with the invention, and its assembled components.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In this specification any singular grammatical gender may subsume any other singular grammatical gender in all cases, and any plural grammatical gender may subsume any other plural grammatical gender in all cases. A user of the invention may be of any biological sex, thus all instances where "he," "his," or "him" are written may be replaced by "she," or "her," as appropriate, to equivalent meaning, effects, intents, and purposes. Grammatically irregular plural forms should be recognized as their plain language equivalents, so that terms such as "at least one foot" are understood to be equivalent to "both feet" and other similar phrases of equivalent meaning.

"Pruner" in this specification includes any and all manner of hand-operated gardening tools designed to cut plant parts such as stems, leaves, stalks, twigs, and branches and the like, mostly by means of bringing together two slightly offset blades to rupture the material being cut by shearing stress overcoming the material strength. "Pruners" in this specification also include scissors, shears, clippers, and other similar hand operated devices having at least two handles or levers connected by a pin so that a grasping hand can pinch and sever plant matter by means of the tool's cutting blades operating at a mechanical advantage which multiplies the user's grasping or clenching force.

In this specification the phrase "operably coupled" and its derivative phrases such as "for operably coupling," when used such as "[A] is operably coupled to [B]" means that when [A] is operated then [B] is caused to operate. The operation of [B] in response to [A] may incorporate but not be limited to a direct relation, a proportional relation, or an inverse relation, and time delays may be designed in between the actuation of device or controller [A] and the behavior of [B.] The phrase "[A] is operably coupled to [C] by means of [B]" means that [A] is operably coupled to [B] and [B] is operably coupled to [C,] so that the intermediate component or system [B] may act as a modulating influence on the operation of component or system [C] in response to actuations of device or controller [A.] The operation of [C] in response to [A] may incorporate but not be limited to a direct relation, a proportional relation, or an inverse relation. Time delays may be incorporated between [A] and [B] or between [B] and [C] or both between [A] and [B] and between [B] and [C.]

Some plants exude gummy sap or other highly viscous or sticky fluids which transfer to a cutting tool during pruning, harvesting, or maintenance performed on plants. The gummed-up tool is harder to operate safely and effectively. The invention relates to machines for cleaning pruners which have been used on plants that exude sticky sap which gums up the pruners so they become useable. Cleaning edged cutting tools presents injury risks to nursery and farm workers, so a need for rapid and effective cleaning machines exists. This pruner cleaning machine includes a motorized rotor assembly of scrubber discs facing each other and a helical center brush disposed between them. The scrubber discs include helical ramps and step faces at the ends of these ramps which conform to the ends of the helical scrubber, so that the spacing between the scrubber discs may be accurately controlled by the number of turns of the helical scrubber, including partial turns. The rotor may be reconfigured for various types of pruners by selecting from among various lengths of helical scrubbers. Properly configured, by using this machine and its inventive scrubbing rotor gummed up pruners may be cleaned in seconds.

Referring now to the figures, FIG. 1 shows an embodiment of a second shaft of a pruner scrubber rotor assembly in accordance with the invention, and its assembled components. The rotor assembly includes two scrubber disc assemblies arranged on the shaft with their scrubbing faces facing each other. Each scrubber disc [135] has a scrubbing medium which in this embodiment shown includes one or more radial arrays of bristles arranged into tufts [138.] The two scrubber disc assemblies each define a scrubbing face, and the totality of bristle ends stochastically define a planar zone which is a scrubbing face or a scrubbing plane. The scrubber discs are secured to the shaft with clamps [358] and optionally they may be oriented so that their tufts align and oppose each other, or preferably they may be aligned so that their tufts interdigitate. The planes defined by the mutually opposed scrubbing mediums may be fixed by the shaft clamps to be coplanar or in two parallel planes depending on the type of pruner to be cleaned. For pruners having thick blades, the rotor may be configured with a gap between the scrubbing planes, or alternatively if the cantilevers of the bristles are long and soft, they may be spaced so that the bristles extend past each other.

The second shaft has a first end proximal to a first shaft described in detail further below in this specification, and a distal end which is supported by a bearing [207.] The bearing is preferably a ball bearing but may be a journal bearing, a needle bearing, or any suitable bearing capable of supporting moderate or sporadic thrust loads. Although less practical, it is possible and within the scope of the invention to arrange a rotor having only one scrubber disc facing a blank disc so that cleaning only occurs on one side, and a user would insert a fouled pruner a first time to clean one side of its blades, and then flip it around and insert it a second time to clean the other side of its blades.

A shaft seal assembly includes a seal body [313] with slots forming a cross into which a cross-shaped compression plate [312] is received. A spacer or sleeve [344] prevents axial separation of the scrubber brushes in case the clamp was not properly secured or if the clamp works loose.

Figure 2:
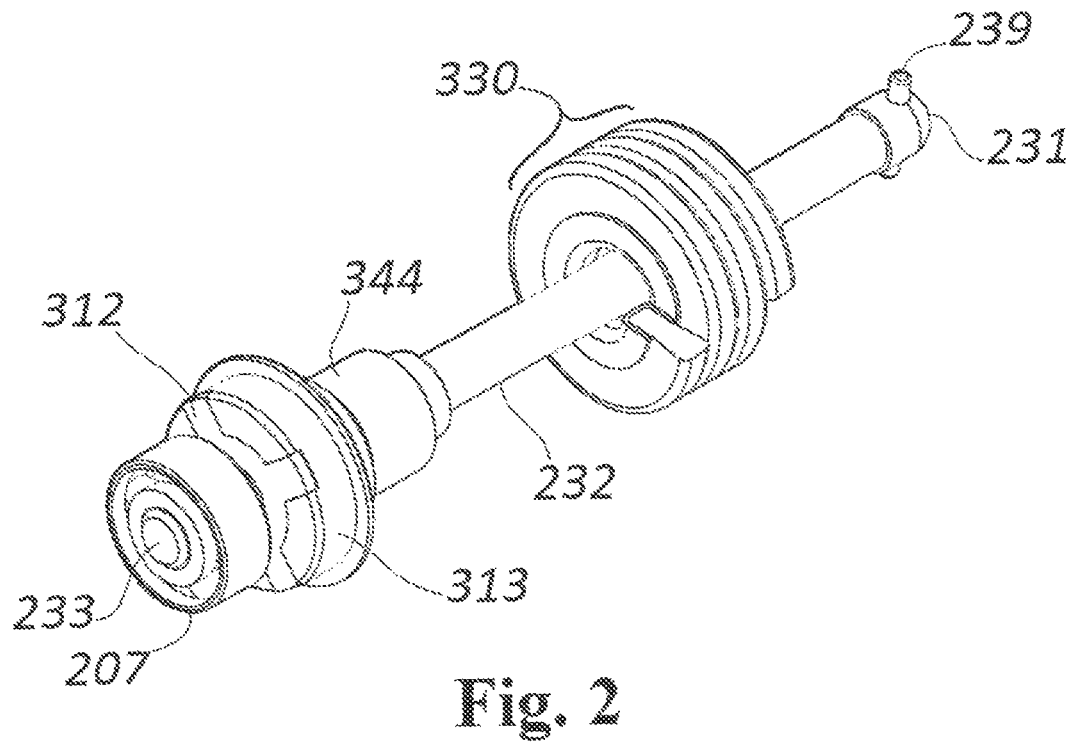
FIG. 2 shows the second shaft of the pruner scrubber rotor assembly of FIG. 1, and also a drive pin, a helical scrubber, a spacer, a shaft seal and an end bearing.

FIG. 2 shows the second shaft [232] of the pruner scrubber rotor assembly of FIG. 1, and also a drive pin [239] which is also called a drive dog, a helical scrubber [330] residing coaxially upon the shaft, a spacer [344,] a shaft seal [313,] and an end bearing [207.] The second shaft has a distal end [233] and a proximal end [231] which includes a bulbous, spherical, or convex end face. A compression plate [312] includes arms which are received into radial slots of the seal body [313.] The ends of the arms extend radially beyond the seal body so that when inserted into a housing they skive the walls of a receiving pocket within the housing and secure the seal from slipping or spinning with the shaft. A drive dog may be any one or more radial projections on the second shaft which is engaged by slots or other complementary rotational coupling features on the first shaft.

Alternatively, a cancellous material may be extruded and coiled into a helix to form a helical scrubber. The pitch of the helix provides a useful lateral scrubbing effect as it turns, by providing superior cleaning by laterally shearing the foreign material off the pruner blade edges in contact with the helical scrubbing elements. The tangential forces dislodge the material while the axial motion wipes it off the blade.

Figure 3:
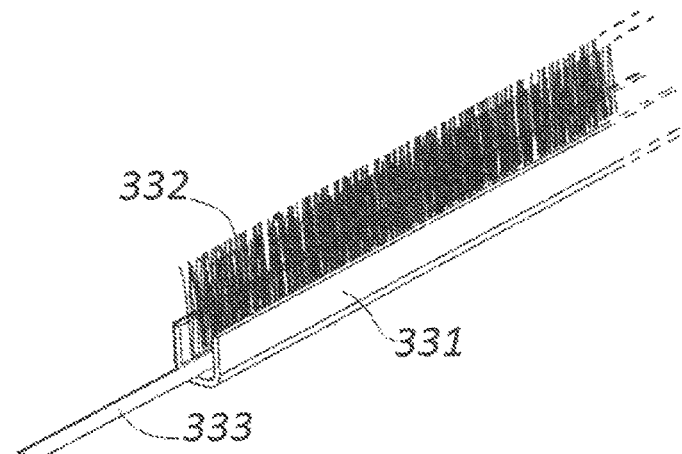
FIG. 3 shows an intermediate assembly step for an embodiment of a helical scrubber in accordance with the invention.

FIG. 3 shows an intermediate assembly step for an embodiment of a helical scrubber in accordance with the invention. Strip material is formed into a "U" channel [331] similar to the way continuous gutters are formed. Bristles [332] are lain atop the channel and a spline [333] of material is forced into the channel, orienting the bristle ends upward in the channel. A second operation may be used to clamp the sides of the channel to splay the bristles outward. The folding up process defines a longitudinal extrusion direction as it grabs and clamps the bristles.

The spline member residing in the center bottom of the U acts like the center paddle of a paint brush and the U channel acts like the ferrule bound around the paint brush bristles. This clamped bristle structure is robust and will withstand severe service and accidental abuse. A final forming step deforms the linear channel into a tightly wound helix so there is no gap between the tightly wound flights of bristles within their constant helical pitch.

After forming the channel and its longitudinal set of bristles, the channel is then coiled into a helix. By forming the helix tightly enough to close the gap between one pitch of bristles and the next, thus preventing a gap between the bristles, the inserted blades of the scissors being cleaned are prevented from dropping in between the coils of the channel and prevented form direct contact with the central axle of the scrubber, which being metal, would dull the cutting blades. It is also preferable to provide central scrubbing materials or bristles of sufficient density so that the pruner blades do not contact the U-channel of the helical scrubber.

Figure 4A:
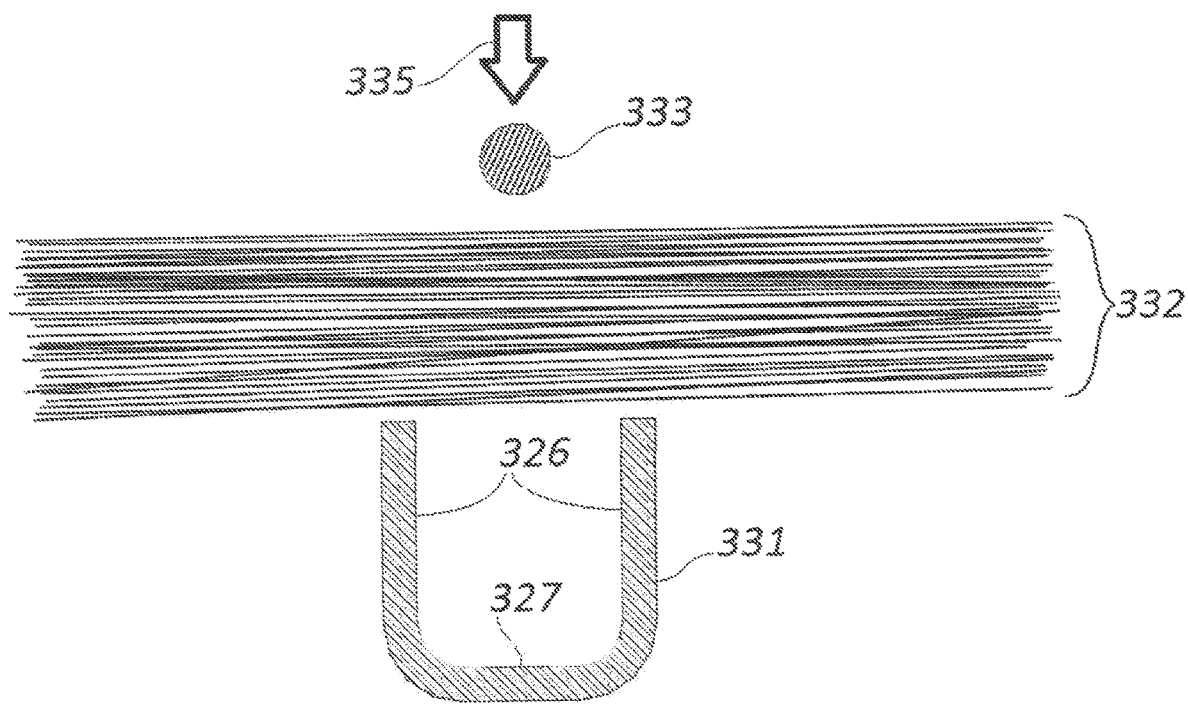
FIG. 4a shows a cross section of a bristle manufacturing step for a helical scrubber in accordance with the invention.

FIG. 4a shows a cross section of a bristle manufacturing step for a helical scrubber in accordance with the invention. A strip material is formed to create a floor [327] and channel walls [326.] Bristles [332] are lain atop the walls of and athwart the longitudinal direction defined by the channel [331.] A spline member [333] is inserted from above to pinch the bristles about their midsections and draw them into the channel in the direction shown by arrow [335.]

Figure 4B:
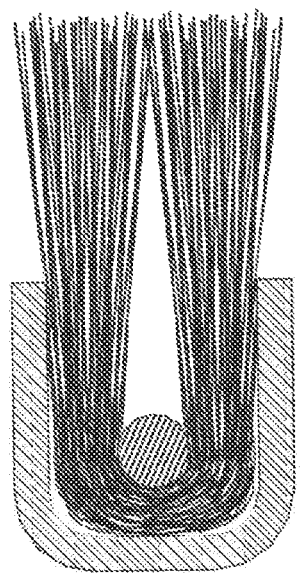
FIG. 4b shows a cross section of an embodiment of a bristle configuration for a helical scrubber in accordance with the invention.

FIG. 4b shows a cross section of an embodiment of a bristle configuration for a helical scrubber in accordance with the invention. The scrubber comprises a spline member received within a formed channel, with a plurality of bristles clenched between the walls of the channel and passing between the spline and floor of the channel. When coiled into a helix the walls become radially extending walls extending from the floor of the channel.

Figure 4C:
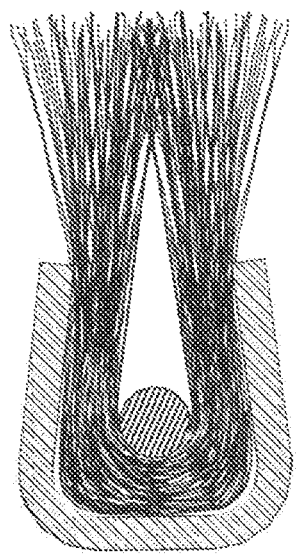
FIG. 4c shows a cross section of an alternative embodiment of a bristle configuration for a helical scrubber in accordance with the invention.

FIG. 4c shows a cross section of an alternative embodiment of a bristle configuration for a helical scrubber in accordance with the invention. The degree of pinching of the "U" cross section of the channel controls the lateral or transverse spread of the bristles within the continuous channel being formed. A desired bristle configuration may be achieved by means of multiple forming operations on the channel and sequential tightening of the spline clenching the bristles.

Figure 4D:
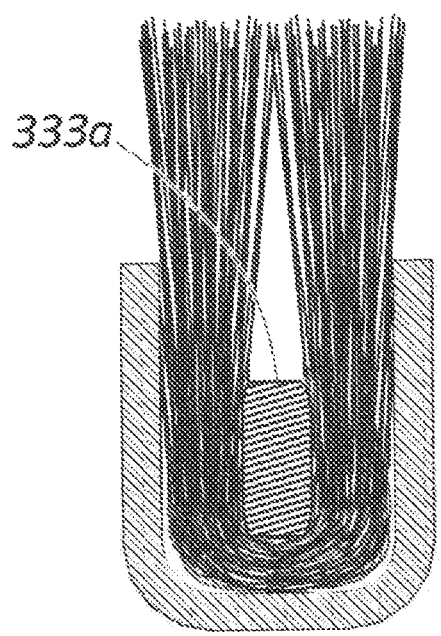
FIG. 4d shows a cross section of another alternative embodiment of a bristle configuration for a helical scrubber in accordance with the invention.

FIG. 4d shows a cross section of another alternative embodiment of a bristle configuration for a helical scrubber in accordance with the invention. In this configuration, rather than a round wire, the spline member [333a] is a rectangular strip preferably having rounded or smoothened corners which prevent nicking or chafing of the bristles clenched by the spline.

Figure 4E:
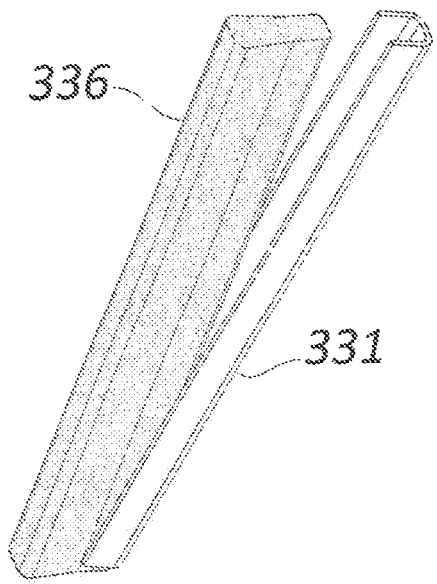
FIG. 4e shows a manufacturing step for another alternative embodiment of a bristle configuration for a helical scrubber in accordance with the invention.

FIG. 4e shows a manufacturing step for another alternative embodiment of a bristle configuration for a helical scrubber in accordance with the invention in which the helical scrubber comprises a cancellous material [336] inserted into a channel [331.] Alternatively, a U-shaped binder may be coextruded with a scrubbing substrate such as a cancellous material. The components may be assembled into a linear structure first and then coiled into a helix.

Figure 5A:
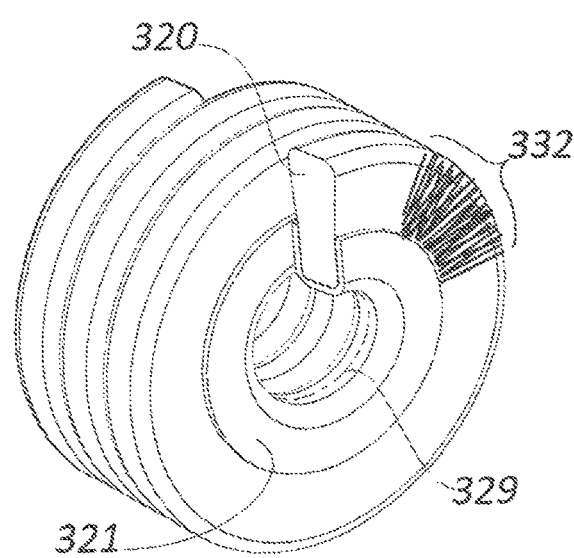
FIG. 5a shows an embodiment of a helical scrubber in accordance with the invention.

FIG. 5a shows an embodiment of a helical scrubber in accordance with the invention. After forming a linear channel and populating it with bristles or a cancellous material, the channel is coiled into a helix so that the helical scrubber comprises a plurality of bristles clenched between radially extending walls of the channel. The helical scrubber defines a helical contour [329] and further comprises a plurality of bristles [332] oriented within 20° of perpendicular to the helical contour. The helical scrubber may also be called a spiral brush or also called a cylindrical brush.

The axial length of the helical scrubber is defined by its number of turns. The axial length of the helical scrubber may be accurately controlled by controlling the number of turns of the helix, including non-integer values of the number of helical turns. The ends of the helical scrubber have a helical end face [321] and the cutoff end of the coiled scrubbing medium and the channel within which it resides form a step face [320] perpendicular to the helical contour of the scrubber.

Figure 5B:
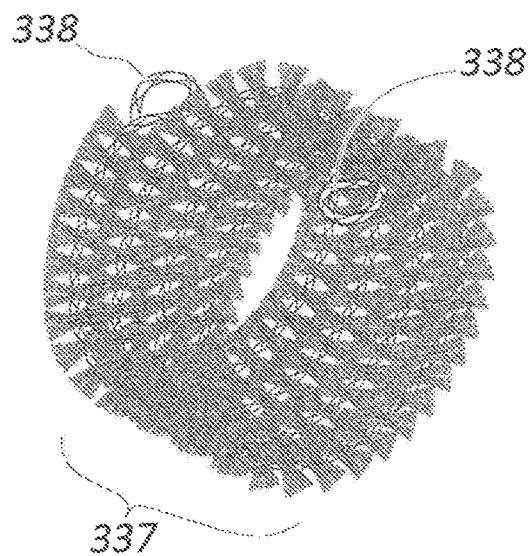
FIG. 5b shows an alternative embodiment of a helical scrubber in accordance with the invention.

FIG. 5b shows an alternative embodiment of a helical scrubber [337] in accordance with the invention. This scrubber is made by twisting a pair of wires around one or more pluralities of bristles to form a long cylindrical volume of bristles. The bristles may reside in one or more helical arrays conforming to the twisted pair of wires along its length. Some scrubbers designed for cleaning test tubes, small pipes, or cleaning within narrow passages are formed in this way, but the invention adds a new step of coiling the twisted wire pair into a helix as shown in the figure. The ends of the wires are formed into loops [338] which may be secured to the scrubber discs with screws, clips, hooks or pegs. These attachment features provide a discontinuity from the helical ramp (including a flat surface being a helical ramp with a pitch angle of zero) and this discontinuity comprises a step face for the helical brush to abut as an attachment site. Since the helical brush is weak in compression, when using this type of helical scrubber brush, the spacing between the scrubber discs is controlled by having the bosses ([353 of FIG. 6b] described below) of the spindles of the scrubber disc assemblies extend so that they abut each other on the rotor shaft.

Figure 6A:
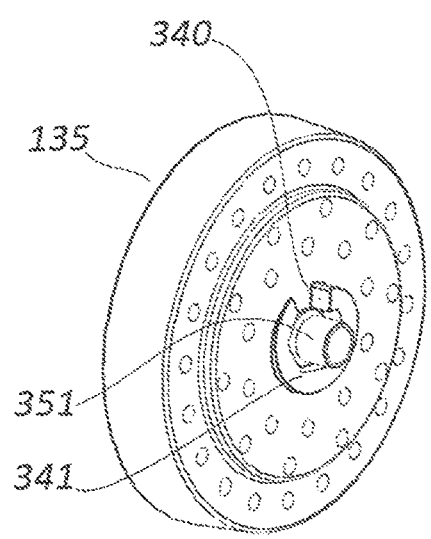
FIG. 6a shows an embodiment of some components of a scrubber disc assembly in accordance with the invention.

FIG. 6a shows some components of an embodiment of a scrubber disc assembly in accordance with the invention. The scrubber disc [135] includes a central aperture which receives a spindle [351] This embodiment includes tiered annular surfaces so that peripheral bristles are longer cantilevers than the central bristles. Since the radial velocity of the peripheral bristles is greater than the more central bristles, the longer cantilever makes them softer in compensation for their higher scrubbing speed, which equalizes their scrubbing effect with respect to the slower velocities of the central scrubbing bristles, so that the cleaning effect is distributed evenly along the length of the pruner blades in contact with the scrubbers.

The scrubber discs each have a helical ramp [341] on their scrubbing face which continues to a discontinuity feature called step face [340.] The helical pitches and ramps of the scrubber discs are complementary to the helical end faces of helical scrubbers designed for assembly with the scrubber discs of a scrubber rotor assembly in accordance with the invention.

In assembling the discs and spiral brush, the helical scrubber is inserted onto the central axle and rotated until the step face of the helical scrubber contacts and abuts the step face of a first scrubber disc secured to the shaft. The second scrubber disc is then added onto the shaft with its scrubbing face facing the other scrubber disc, and then rotated until its step face abuts the step face of the opposite end of the helical scrubber, and then the second scrubber disc clamp is secured with an end face of the helical brush in contact the helical ramp of the scrubber disc, and preferably with both helical ramps of both scrubber discs in close contact with the helical end faces of the helical scrubber.

An alternate embodiment of a scrubber disc in accordance with the invention includes a flat central face, with a peg or stub protruding from the disc face acting as a discontinuity which is the step face. In this specification a flat circular or annular surface is encompassed within the helical ramp claim element by means of it incorporating a degenerate but nevertheless present helix having a pitch angle of zero, and thus in this specification the term helix includes a ring, because a ring is a helix with a pitch angle of zero, and a split washer may be described as a one-turn helical spring having a pitch angle of zero.

Figure 6B:
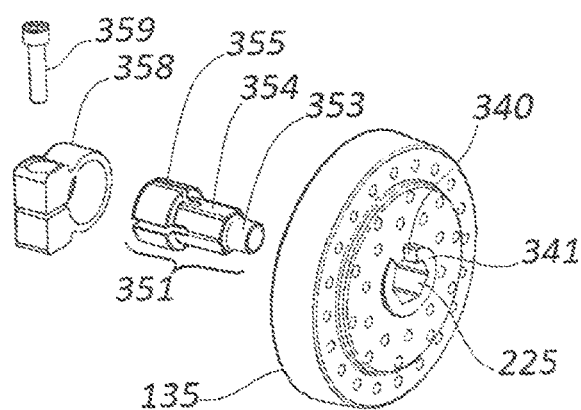

FIG. 6b is an exploded view of the components of the scrubber disc assembly shown in FIG. 6a. The scrubber disc [135] has a central aperture [225] which has a polygonal cross section and receives a spindle [351.] The scrubber disc face also includes a helical ramp feature [341] and a step face [340] at an end of the helical ramp which is perpendicular to the helical ramp. The pitch of the helical ramp is complementary to a helical end face of a helical scrubber configured for assembly and operation with the scrubber disc.

The spindle has portion with a polygonal exterior cross section [354] complementary to the central aperture of the scrubber disc, a boss [353] protruding from the polygonal portion, and a castellated portion [355.] The castellated portion is girdled by a shaft clamp [358] and secured with threaded hardware [359] so that the slot edges of the castellated portion of the spindle may incise the shaft to which they are assembled and grip it securely.

Figure 6C:
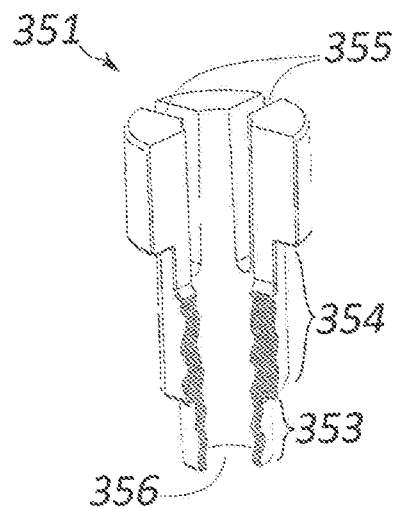

FIG. 6c is a partially broken view of a spindle [351] for the scrubber disc assembly of FIG. 6a. The spindle includes a portion having a polygonal exterior [354] complementary to the polygonal interior of the hub, or of the scrubber disc where a hub of a second material is not used. The spindle may be made of metal or of a plastic selected to act as a limited slip clutch on the shaft by means of a castellated section [355] girdled by a clamp. Adjusting the tightness of the clamp determines the slipping torque for the scrubber disc. The ability for the scrubber disc to slip on its drive shaft allows it to act as a mechanical safety fuse in case of accidental or abrupt obstruction or rotational arrest of the rotating discs. This safety feature also reduces the chance of injury if articles of clothing or an operator's hair were to accidentally enter the active scrubbing volume and become entrained in its mechanism.

A central aperture [356] extends throughout the length of the spindle, and when assembled the boss portion [353] of the spindle axially extends beyond the helical ramp of the scrubber disc. The outer diameter of this boss resides within and is closely fitted to the inner diameter of the helical brush so as to enforce concentricity of the helical brush bristles with respect to the other circular volumes of scrubbing materials and to eliminate assembly eccentricity which would produce unwanted vibration and noise. Eccentricities of the scrubbing components may also present an operating hazard of grabbing the blades of a tool inserted to be cleaned. The tool could then be damaged by having one of its blades bent, or by being ejected from the machine to become its own hazard as an uncontrolled sharp-edged flying object in a workspace. Also, the impulse or sudden change in torque caused by a sudden arrest of the rotating scrubbers may bend the rotor axle, so configuring the clamp as a slip clutch or mechanical fuse protects the shaft from this damage.

Figure 7A:
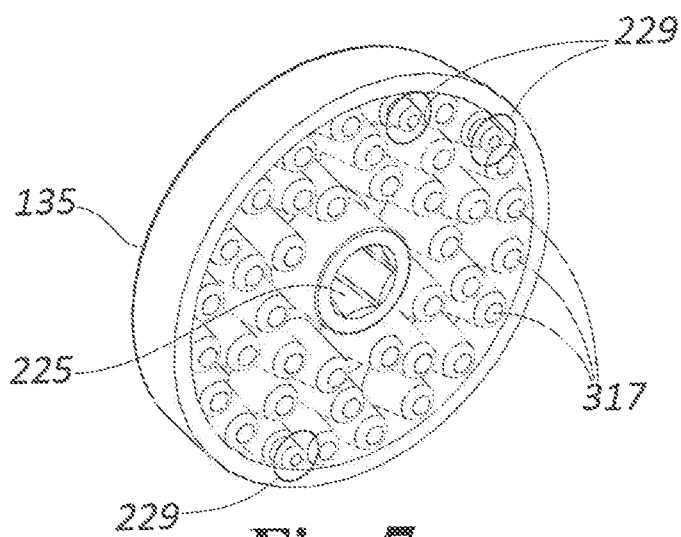
FIG. 7a shows an alternative embodiment a scrubber disc in accordance with the invention.

FIG. 7a shows an alternative scrubber disc [135] in accordance with the invention, designed for moderate service. The scrubber disc has a central aperture [225] having a polygonal cross section. This view shows the backside of the disc opposite from its scrubbing face.

Poka-yoke (PO-ka YO-keh) studs [229] are used to orient the alveolar pockets [317] which receive groups of bristles arranged into tufts. The pockets are designed to provide nearly consistent wall thickness throughout the entire part, which is preferred for injection molding. Because the arrays of tufts may be staggered so that they interdigitate when the scrubber discs are assembled with their scrubbing faces facing each other, the discs may be manufactured as first and second discs with the arrays clocked with respect to each other. The poka-yoke stubs may be fitted into holes in an application specific manufacturing jig to enforce alignment of a scrubber disc blank as it is being drilled or populated with bristles, so that CNC programming of drillings or tuft stuffing operations will locate the bristles in their expected alveolae. The poka-yoke studs also agitate and propel cleaning solvent within the cleaning volume of the machine and keep cleaned-off resins and particulates of the clipped plants in suspension to diffuse their essences into the solvent. These essences may be recovered, filtered, purified, and concentrated to create valuable derivative products from the plant matter.

Figure 7B:
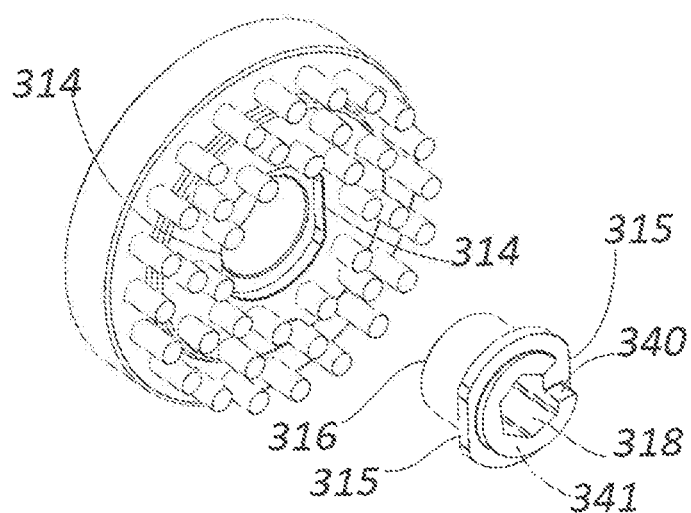
FIG. 7b shows an exploded view of components of another alternative embodiment of a scrubber disc assembly.

FIG. 7b shows an exploded view of the components of another alternative embodiment of a scrubber disc assembly which includes a metal hub [316] having a helical ramp [341] and a step face [340,] and a polygonal bore [318] of which one optional embodiment is a hex as shown, but which may be another polygon such as a triangle, a square, rectangle, a pentagon, a heptagon or an octagon et cetera. The hub includes a circular flange having two flats [315] to form a double-D. The body of the scrubber disc may be insert molded onto the metal hub, or formed as a separate, detachable, and exchangeable part attached to it. With separable parts, the central aperture of the scrubber disc includes a counterbore with flats [314] complementary to the flats of the hub flange. Other arrangements of flats on the hub complementary to flats in the central aperture may be employed to rotationally couple the disc to its hub. A polygonal set of flats in the hub flange may thus interoperate with a polygonal set of flats in the central aperture of the hub to rotationally couple and lock the disc to its hub.

The metal hub and its polygonal bore and flange are robust enough to transmit higher torques to the perimeter of the scrubber disc, and this embodiment is preferred for severe service. Besides metal, other materials tougher than the pedestrian plastics of the scrubber disc of FIG. 7a may be used, such as glass filled polymers, ceramics, or sintered materials. According to one embodiment the torques supplied to the discs for scrubbing exceed 560 inch-ounces.

Figure 8:
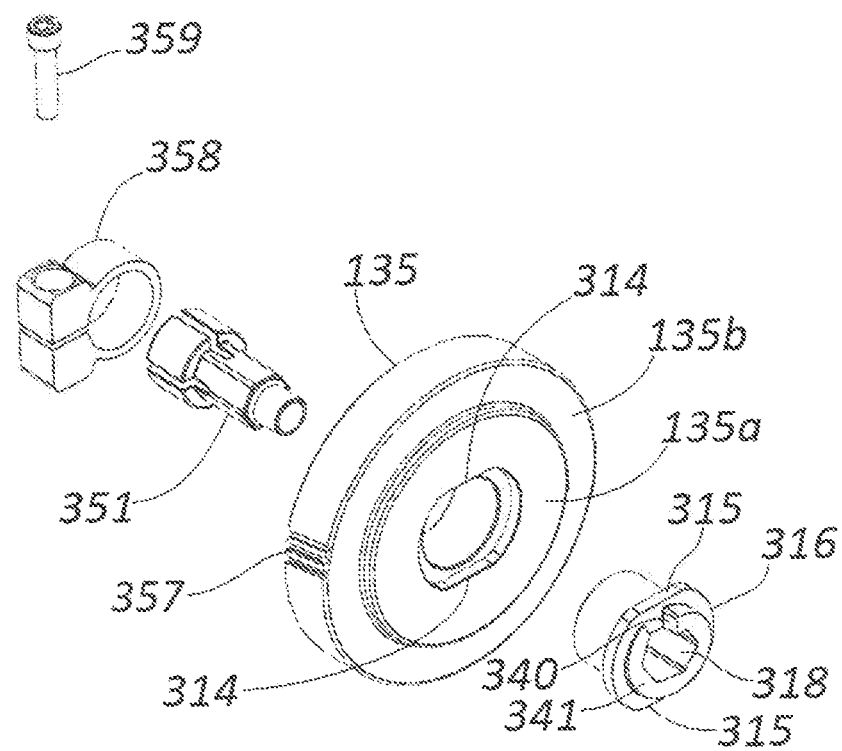
FIG. 8 shows yet another alternative embodiment of a scrubber disc assembly in accordance with the invention, and a clamp assembly used to secure the scrubber disc to the second rotor shaft.

FIG. 8 shows yet another alternative embodiment of a scrubber disc assembly in accordance with the invention, and a clamp assembly used to secure the scrubber disc to the second rotor shaft. The hub [316] includes a helical ramp [341] and a step face [340,] and a polygonal bore [318,] and a circular flange having two flats [315] to form a double-D. The scrubber disc [135] has two tiered annular surfaces [135a, 135b] and a central aperture with a counterbore having two flats [314] complementary to the flats of the hub flange. Optionally according to this embodiment, the rim of the scrubber disc may include splines, paddles [357,] or other striations which act as paddles in the cleaning fluid to impel and disperse cleaning solvent within the cleaning volume of the machine so that blades being cleaned are supplied with fresh cleaning fluids, and to agitate suspended plant matter, cleaned-off resins, and other particulates of the clipped plants in suspension so as to diffuse their essences into the solvent. The castellated spindle [351] fits through the central hole of the scrubber hub [316] so that its polygonal outer cross section is received within the complementary polygonal portion of the central aperture of the hub. Only a portion of the central aperture of a hub or of a scrubbing disc needs to be polygonal in order to pick up torque from a polygonal portion of a hub or spindle. The spindle is then secured to the shaft as described previously, with the clamp [358] and threaded hardware [359.]

Figure 9A:
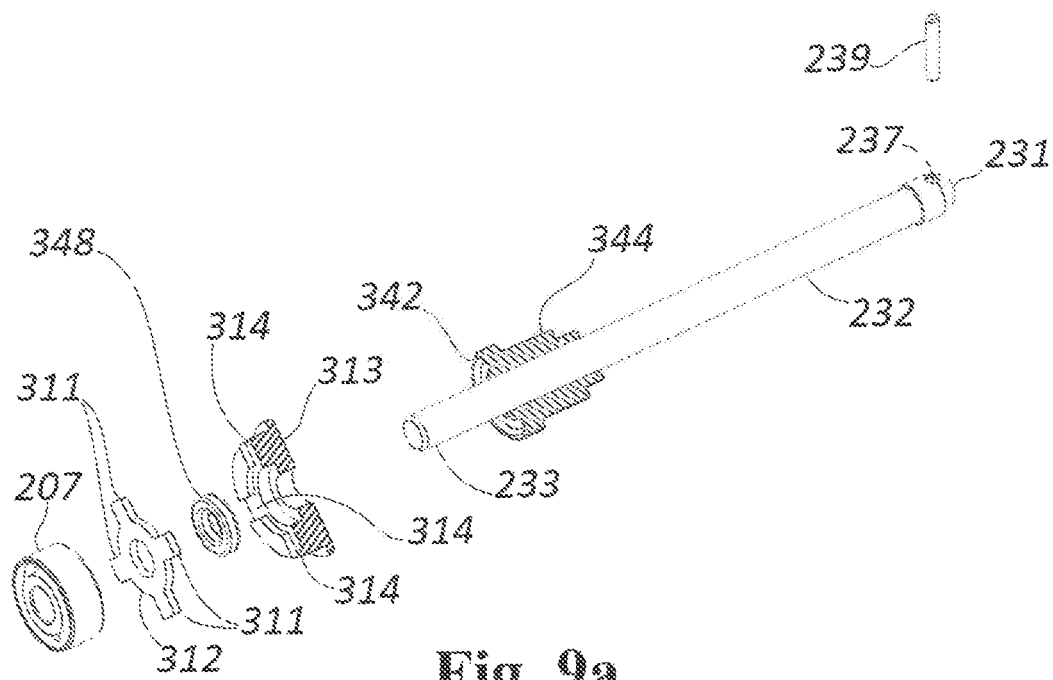
FIG. 9a shows an embodiment of a second rotor shaft and exploded components of a spacer, a shaft seal, an end bearing, and a connecting pin.

Omitting the scrubber discs and the helical brush, FIG. 9a shows an embodiment of a second rotor shaft [232] and exploded components of a spacer [344,] a shaft seal [313,] an end bearing [207,] and a drive pin [239.] The first rotor shaft will be described further below in the specification. The second shaft has a distal end [233] and a proximal end [231] having a bulbous, spherical, or convex end face [231,] and a transverse aperture [237] for receiving the drive pin.

The spacer includes a flange with an axially extending lip [342] which resides in close proximity to the shaft seal [313.] The stepped set of increasing diameters and the lip of the spacer act as a "slinger" which expels fluids and foreign matter suspended in the fluid radially away from the shaft. As the fluid moves to portions of the seal having higher rim speeds (at constant angular velocity) it is increasingly likely to be flung free of those rotating surfaces. The slinger reduces the amount of fluid which might otherwise migrate into or past the shaft seal.

Distal from the shaft seal is a cross shaped compression plate [312,] made of an elastic, resilient material and preferably made of polypropylene. Four arms [311] of the compression plate fit into the slots [314] of the shaft seal to prevent it from rotating. A seal gland [348] presses into a counterbore in the seal body. Although an o-ring may be serviceable as a shaft seal, glands having an "X" cross section or internal ribbing may provide superior performance.

Figure 9B:
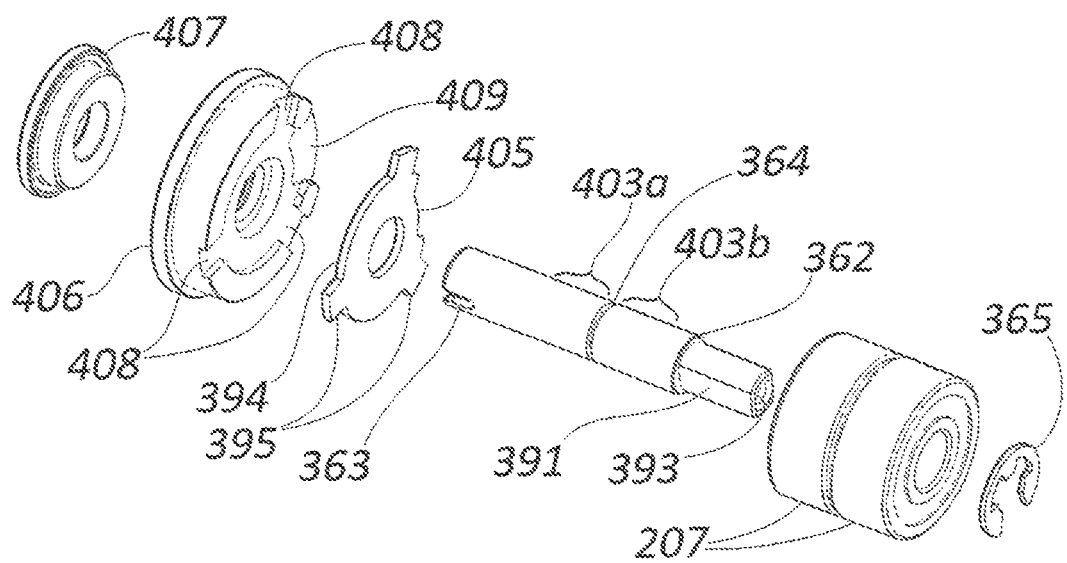
FIG. 9b shows an embodiment of a first rotor shaft and exploded components of shaft bearings, seal components, and a snap ring for assembly thereon.

FIG. 9b shows an embodiment of a first rotor shaft [362] and exploded components of shaft bearings [207,] seal components, and a snap ring [365] for assembly thereon. The first rotor shaft includes a threaded aperture [393] in a proximal end, and two flats [391] which form a double-D for attachment of a pulley. The snap ring is installed in a snap ring groove [364] between two portions of the shaft [403a, 403b] where the bearings will reside when the assembly is complete.

A shaft bushing [407] presses over the end of the shaft and includes a flange which acts as a slinger to radially expel fluid and suspended matter and prevent it from migrating past the shaft seal [406] as explained previously. Although cruciate bars of a compression plate may be used to secure the seal from rotation in its pocket in the housing, in this embodiment three radial slots [408] in the seal body receive the three arms [395] of a compression plate [394.] Compression plates having fewer or more arms and seal bodies having complementary numbers of slots also reside within the scope of the invention. A notch [405] in the compression plate and a pocket [409] in the seal body align to form a drain to collect and divert any overflow which may escape past the rotating seal member should a clearance develop from wear after a long service life. Lastly in this figure, the distal end of the first rotor shaft includes a transverse slot [363] which rotationally couples to the transverse pin [239] of FIG. 9a of the second rotor shaft, which is also called a drive pin.

Figure 10:
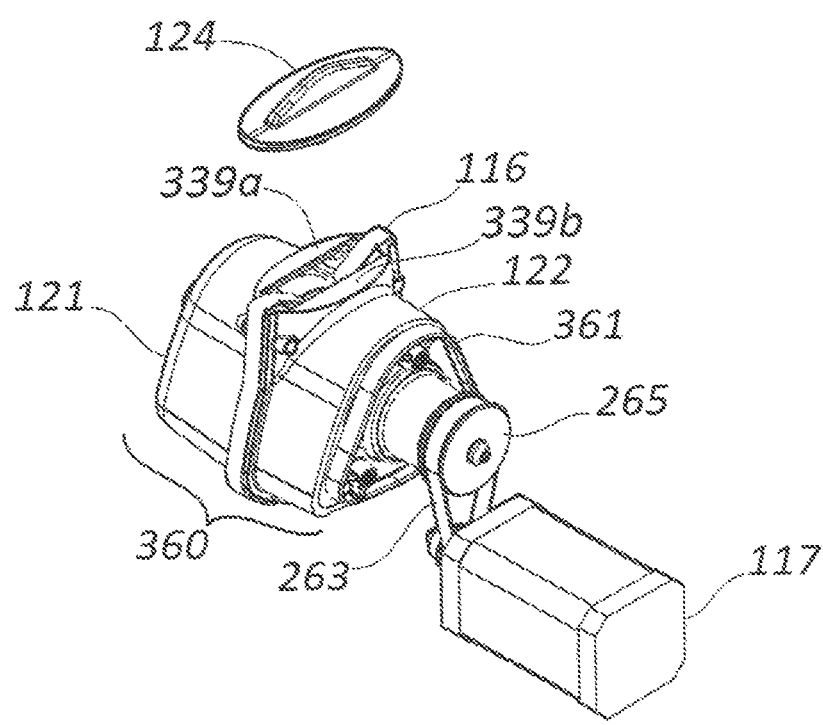
FIG. 10 shows an embodiment of first and second half-housings which contain components of a pruner scrubber rotor assembly in accordance with the invention, a housing seal disposed between the half-housings, a cap, a drive motor and a belt drive assembly for operatively coupling the drive motor to the pruner scrubber rotor assembly.

FIG. 10 shows an embodiment of first and second half-housings [121, 122] which contain components of a pruner scrubber rotor assembly in accordance with the invention, a housing seal [116] disposed between the half-housings, to form a complete housing [360,] and a cap [124,] a drive motor [117] and a belt drive assembly for operatively coupling the drive motor to the pruner scrubber rotor assembly. The half housings respectively include seating surfaces [339a, 339b] for the cap. The machine is capped when not in use to preserve the volatile cleaning solvent from evaporation.

A backing ring [361] secured to one of the half-housings transfers most of the reaction torques from scrubbing directly to the main outer housing (not shown in this figure) to isolate other components from twisting forces and vibrations. The backing ring may include threaded inserts to permanently capture the screws. The first shaft has a pulley [265] attached to it, which is driven by a belt [263.]

Figure 11:
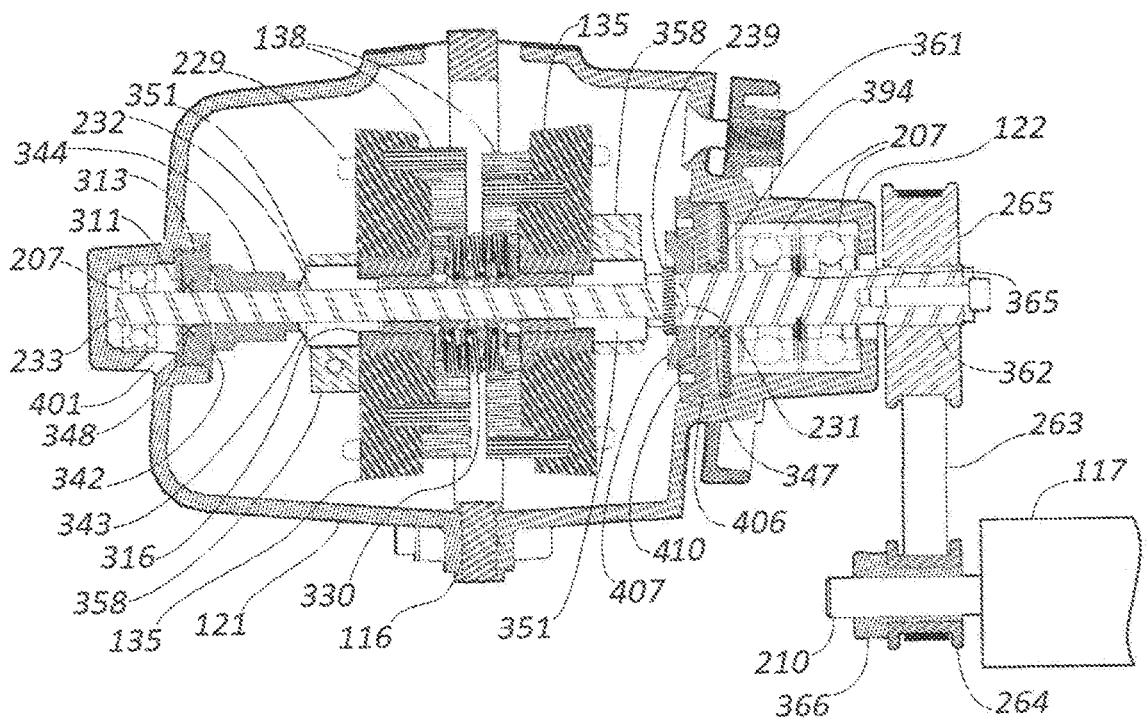
FIG. 11 is a cross section view of the half housings and seal of FIG. 10 containing an embodiment of a pruner scrubber rotor assembly comprising scrubber discs of FIG. 6a, the first and second rotor shafts of FIGS. 9b and 9a respectively, and the belt drive and motor components seen in FIG. 10.

FIG. 11 is a cross section view of the half housings and seal of FIG. 10 containing an embodiment of a pruner scrubber rotor assembly comprising scrubber discs of FIG. 6a, the first and second rotor shafts of FIGS. 9b and 9a respectively, and the belt drive and motor components seen in FIG. 10. A pruner cleaning machine in accordance with the invention includes first and second half-housings [121, 122] defining a cleaning volume, with a seal [116] disposed between the first and second half-housings. The second half housing is reinforced by a backing ring [361] permanently attached to it. The backing ring is temporarily secured by screws and is then permanently set in place by the screws while a permanent adhesive such as an epoxy may be allowed to set up and cure. Alternatively, solvent bonding may be used when these two components are made of compatible polymers. It is also feasible within the scope of the invention to include an energy director on one or both parts so that they may be joined by an ultrasonic weld. The backing is located at this portion of the half-housing to stabilize the union of the first shaft to the second shaft against vibration and deformation from a user leaning on the housing at this location while forcibly keeping an inserted pruner in the cleaning volume while the machine is running.

A first shaft [362] resides at least partially within the cleaning volume and a second shaft [232] is operably coupled to the first shaft. Two scrubber disc assemblies each define a scrubbing face, and the disc assemblies are arranged on the second shaft with scrubbing faces facing each other.

A scrubber disc assembly further comprises a scrubber disc [135] having a central aperture and a scrubbing medium, which in this illustration is a plurality of bristles [138] arranged into radial arrays of tufts. The backside of a scrubbing disc includes one or more stubs [229] used to 'clock' the disc during machining of pockets in the discs which receive the tufts. For moderate or regular service, the discs are fitted onto a spindle [351] which is secured to the second shaft by a shaft clamp [358.] For high torque and more severe service applications, the coupling of the disc to the shaft is reinforced with a hub [316] molded into, pressed into, or otherwise securely installed into the disc, and the hub rotatably couples to the spindle by a polygonal orifice in the hub being complementary to a polygonal exterior cross section on the spindle.

A helical brush [330] resides coaxially upon the shaft between the scrubber disc assemblies, and the spacing between the discs may be controlled by the angular length (the number of turns, which may be a non-integer value) of the helix, which controls the axial length of the helical brush. The spacing of the mutually-facing sets of bristles on the two scrubber discs may be accurately controlled by their contact with the ends of the spiral brush. Thus the scrubber rotor assembly of the cleaning machine may be optimized for different models of pruners by maintaining on hand an assortment of spiral brushes of various axial lengths, so as to adjust the spacing or interference between the scrubber tufts or rings of scrubber material on the mutually-facing scrubber discs. The second shaft has a convex end [231] and the first shaft has a concave end into which the convex first end of the second shaft is received. An axial aperture of the first shaft is tapered or concave to receive and center the ball end of scrubber shaft, which is the second shaft. This union between the shaft ends provides close support for the scrubber shaft but also allows for up to 5° of axial misalignment while fully transmitting torque from the transverse slot of the spindle to the drive pin. Torque and rotary power may be transmitted from the axis of the first shaft to the scrubber shaft while overcoming substantial assembly misalignments in the housing and also without causing side loading in the bearings of the shafts. Bearing life may be extended and noise reduced by alleviating moment loads in the shaft end bearings of the scrubber rotor assy.

Although less preferred, the concave and convex shaft ends may be reversed so that a ball end of the first shaft would seat into the hemispherical end of an axial aperture in the second shaft. Rotational coupling of the first shaft to the second shaft is effected by means of a transverse pin [239] or drive pin installed in the second shaft and residing in a transverse slot cut into the first shaft. Again, an alternative but less preferred embodiment within the scope of the invention has the drive pin on the first shaft received into a transverse slot of the second shaft. The pin size and material may be selected so that it acts as a mechanical fuse which will fail and disconnect the shafts in the event of a fault or rotational shock. The pin may also include one or more intentional fail points such as a groove located where the pin emerges from the transverse hole in the shaft so that the stress concentration at that point defines a predetermined failure torque which disconnects the shafts if exceeded.

Now examining the bearings [207] and seal components at the distal end of the first shaft [362] and proceeding from the interior of the cleaning volume, a slinger [407] resides in front of the shaft seal body [406] and rotates with the shaft to radially expel fluids and foreign matter suspended in the fluid away from the shaft to reduce the amount of cleaning fluid and contaminants from migrating into the bearings. A snap ring [365] disposed between the two bearings prevents the shaft from "walking" or axially slipping out of position. Bearings are available having their own redundant shaft seals.

The seal body is restrained from rotation within its pocket in the housing by a compression plate [394] which includes arms received into radial slots of the seal body. The arms extend beyond the seal body and embed into the housing to prevent rotation. The seal body includes one or more threaded holes [410] so that it may be extracted by a pulling tool similar to a gear puller. A seal gland [347] has an x-cross section which is preferred to a common o-ring as a shaft seal gland.

A motor [117] provides power to the scrubbing mechanism, through a driving pulley [264] to a driven pulley [265] secured to the first shaft of the rotor assembly, with the pulleys connected by a drive belt [263.] The scrubber rotor assembly comprises a motor operably coupled to the first and second shafts through a driving pulley, a drive belt, and a driven pulley. A slip clutch [366] may be optionally included, operating between the motor output shaft [210] and the driving pulley. The slip clutch offers another form of mechanical fuse to disconnect motor shaft rotation from scrubber rotor rotation in the event of a fault. The motor is protected from torsional shock of an accident which halts the shaft abruptly, and a user with clothing or a body part accidentally caught in the cleaning mechanism may be protected by disconnecting drive power at the slip clutch.

Now examining the components on the second shaft distal to the scrubber discs, a wave spring or Belleville spring [343] installed between the distal shaft clamp and shaft spacer [344] to prevent axial separation of the scrubber brushes in case a clamp was not properly secured or if the clamp works loose. Preventing axial separation also prevents the helical brush from working loose from between the step face of the scrubbing discs. Damage to the step face and helical ramp surfaces of the scrubbing discs would occur if these components worked loose and did not rotate in concert. The shaft spacer includes an axially extending rim [342] which acts as a slinger and has a tight clearance to the seal body [313] to exclude foreign matter from entering the space between the seal and the spacer. An axial spring may be optionally installed in the space between the seal and the spacer either in place of or in addition to the axial spring [343.] Bellville washers are preferred in that they provide axial compliance with low parasitic torsional drag. The axial preload provides axial compliance which protects the rotating components and the alignment of their coupled features from shipping shock and other shocks such as if the machine is dropped from the workbench onto a hard floor.

The seal body is restrained from rotation by means of a compression plate which jams its arms [311] to lock against the inner walls of the bearing cup of the housing. Threaded holes in the seal body may be included to allow it to be pulled for maintenance by inserting screws to provide a purchase similar to using a gear puller or bearing puller, or optionally it may lack these feature and be installed as a press fit which would evince unauthorized maintenance attempts such as by a person trying to pry the seal out with a screw driver used as a make shift chisel. The tool marks in the housing interior left behind by such action provides forensic evidence of unauthorized access and may be used to enforce out-of-warranty repair charges or other penalties. A seal gland [348] installed in the seal body has an x-cross section which is preferred to a common o-ring as a shaft seal gland. The distal end [233] of the second shaft is supported by a shaft bearing [207.] The housing also optionally includes a fluid drain [401] as a redundant protection feature to prevent solvents from entering the shaft end bearing.

Figure 12:
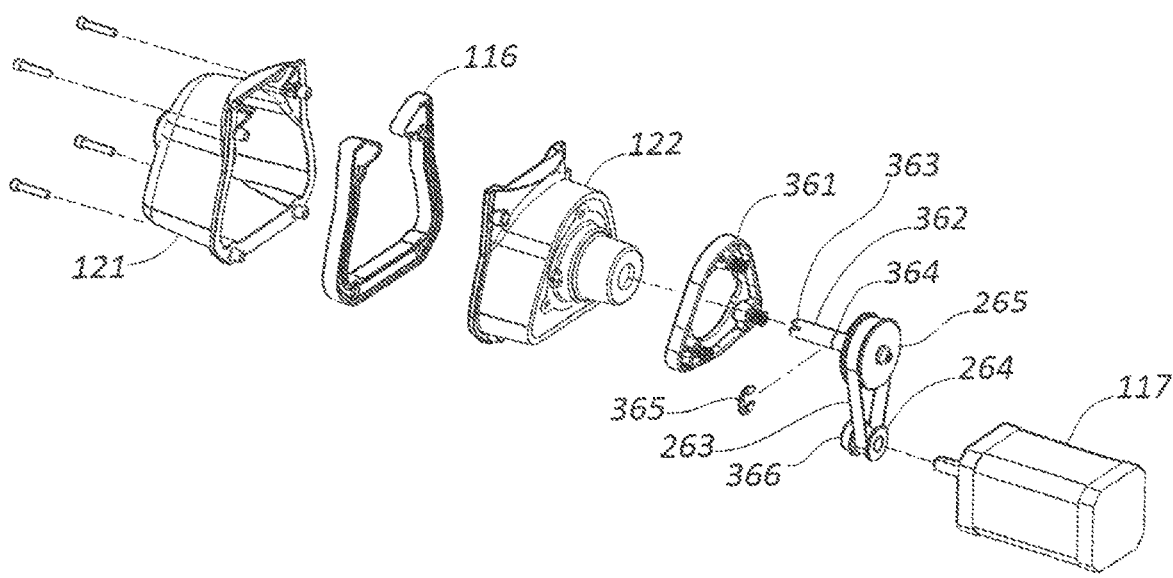
FIG. 12 shows an exploded view of the half housings, the housing seal, the belt drive assembly components and the drive motor.

FIG. 12 shows an exploded view of the half housings [121, 122,] the housing seal [116,] and the belt drive assembly components and the drive motor. The second half housing [122] is supported by a backing ring [361] permanently attached to it, which reinforces its mechanical attachment to the frame structure of the machine within its main housing. Tensile loads from scrubbing or from an operator leaning on the pruners being cleaned are advantageously bypassed through the backing ring to the machine frame rather than through the carefully aligned rotating components of the shafts. The first drive shaft [362] of the machine is also called a drive spindle. The shaft is stabilized by two bearings which bestride a snap ring [365] fitted into a groove [364] in the drive spindle. The drive spindle includes a transverse slot [363] which engages with the transverse pin of the scrubber shaft as explained previously. The pulley has a central aperture which includes flats which engage with complementary flats [391 of FIG. 9b] of the drive spindle. A preferred drive ratio between the driving pulley [264] and driven pulley [265] is a 4:1 turn down ratio. The pulleys are connected by a drive belt [263] and the motor [117] connects to the drive pulley with an optional slip clutch [366] installed on the drive pulley.

Figure 13:
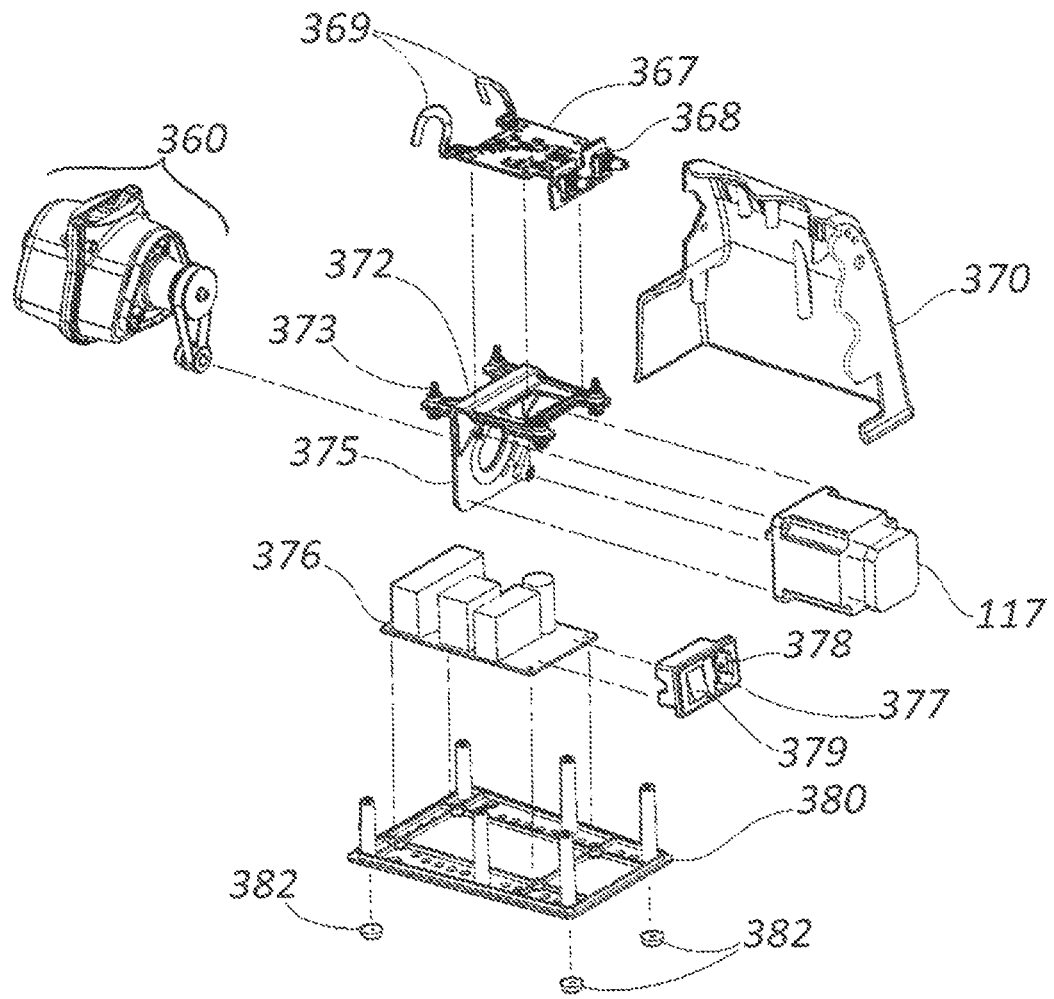
FIG. 13 shows a broken portion of a main shroud, a pruner scrubber rotor assembly encased in its half-housings, and a base plate, a power supply PCB, an external power switch and power receptacle block, motor mount hardware for a drive motor, and other components of an embodiment within the scope of the invention.

FIG. 13 shows a broken portion of a main shroud [370,] a pruner scrubber rotor assembly [360] encased in its half-housings, and a base plate [380,] a power supply PCB [376,] an external power switch and power receptacle block [377,] motor mount hardware for a drive motor [117,] and other components of an embodiment within the scope of the invention. According to a preferred embodiment, a motor is able to deliver at least 150 inch-ounces of torque at about 240 rpm. The main frame structure within the housing includes an H-shaped plate [372] which holds a motor bracket [375] for the motor. The backing ring of the scrubber housing transfers most of the reaction torques from scrubbing directly to this main frame, thus isolating other internal parts such as the motor mount hardware, the drive pulleys, and PCBs from twisting forces and vibrations.

Motor controller electronics reside on a controller PCB [367] and potentiometers for controlling speed and duration reside on a daughter card [368] connected to the controller PCB. Printed circuit boards are referred to as PCBs or sometimes as PCAs, for 'printed circuit assembly.' When plugged in with a power cord inserted into power socket, and with power switch [379] turned on, the machine is actuated by touch, pressure or proximity sensors [369] which are conveniently located so that the user's hand which is not handling the pruner being cleaned may simultaneously weigh upon and stabilize the cleaning machine on a workbench and be detected for the controller board to energize the motor and run a cleaning and scrubbing regimen. The power socket is preferably an IEC 60320 standard socket commonly used for computers.

The sensors may be selected and the controller configured to detect the presence of a hand by means of electrostatic touch sensitivity by which resistance through a user's hand completes a circuit from the first sensor across to the second sensor. Simpler pressure sensitive sensors may also be used and programmed so either or both sensors must detect pressure and signal the controller board for the motor to begin a regimen. Although possible to configure the machine to allow a start by actuation at either site, a preferred embodiment requires not only simultaneous contact but may also require sufficient pressure at both purchase points to ensure that a user is properly anchoring the machine with firm body pressure before allowing it to start. Firmly anchoring the housing with one hand allows the user to effectively control the pruner being cleaned with the other hand while it is subjected to scrubbing torques and reaction forces. The controller board may be secured to the H-plate by vibration attenuating studs [373.] The base of the machine includes elastomeric feet [382.]

Figures 14A, 14B:
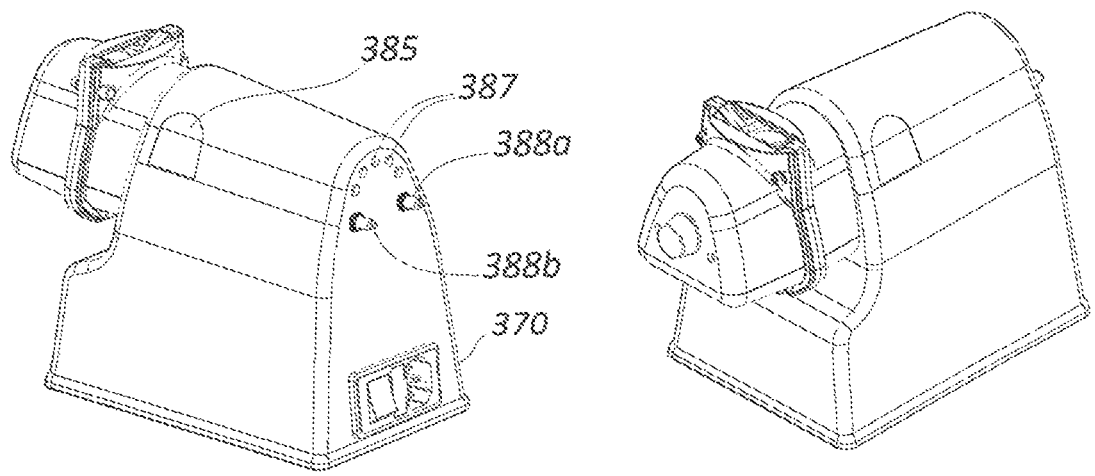

FIG. 14a shows a top right front view of a pruner scrubbing machine in accordance with the invention. The main shroud [370] of the machine includes inset surfaces which indicate the locations of the sensors used to enable the machine to operate by detecting the presence or contact of a user's hand. The main shroud includes heat dissipating apertures or vents [387] which may be designed and located for aesthetic appearance or ornamentally of the machine. Potentiometer shafts [388a] and [388b] are fitted with knobs (not shown) and are used for controlling speed and duration of a cleaning regimen.

Figure 14C:
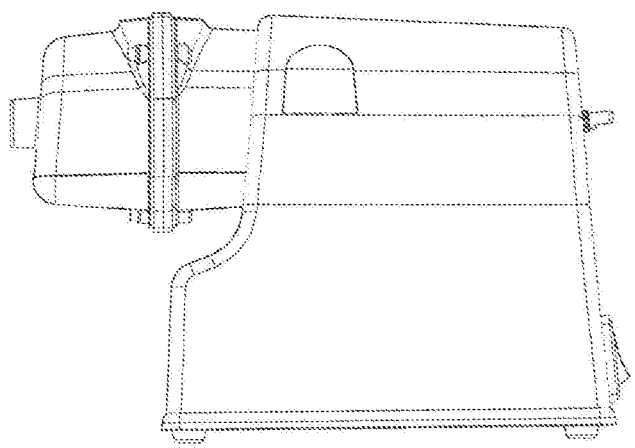
Figure 14D:
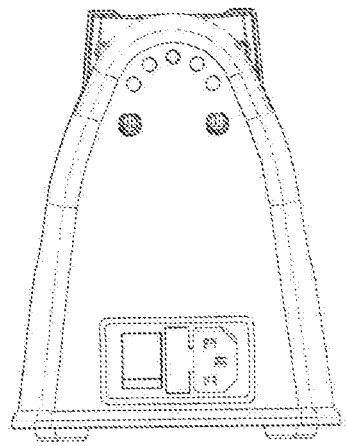

FIG. 14b shows a top left front view of the pruner scrubbing machine of FIG. 14a. FIG. 14c shows a front elevation view of the pruner scrubbing machine of FIG. 14a. FIG. 14d shows a right elevation view of the pruner scrubbing machine of FIG. 14a.

Figure 14E:
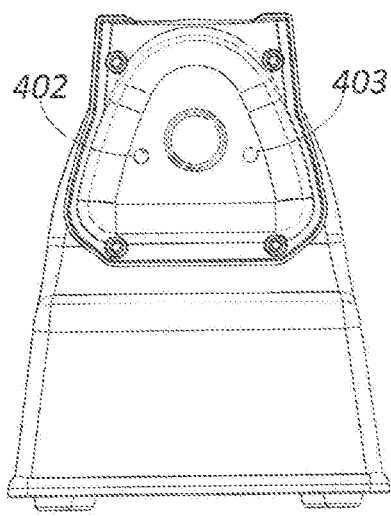

FIG. 14e shows a left elevation view of the pruner scrubbing machine of FIG. 14a. The cleaning volume includes ingress and egress ports [402] and [403] for circulating the cleaning solvent into and out of the machine so that solvent which has become infused with natural oils from the resin and plant materials removed from the pruners as they are cleaned may be collected as a valuable derivative product. Depending on the plants being trimmed, marijuana plant matter exudes cannabidiol (CBD) oils which may be purified and concentrated, and pyrethrins may be extracted form false white hellebore to yield a strong, organically sourced, and effective broad spectrum insecticide. One or both of these ports, or the drain [401 of FIG. 11] may also serve as overflow ports to prevent overfilling of the machine with cleaning fluid.

Figure 14F:
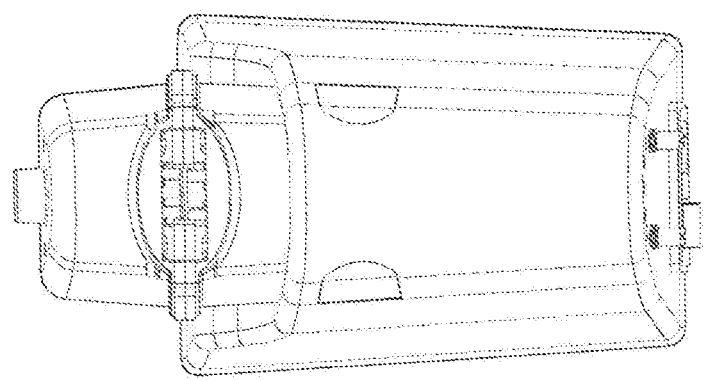

FIG. 14f shows a top view of the pruner scrubbing machine of FIG. 14a.

Figure 15A:
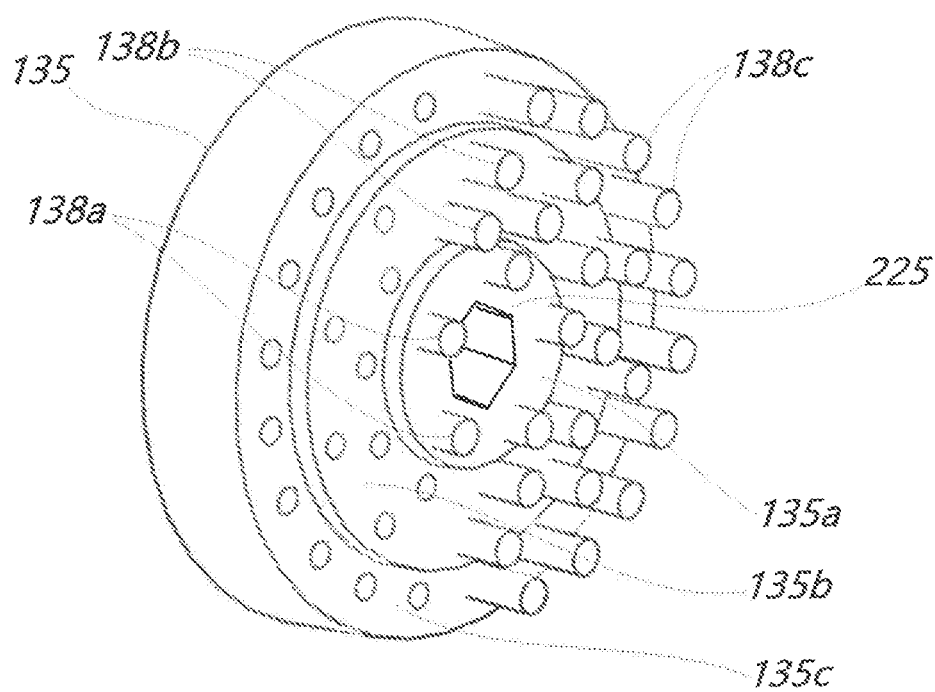
FIG. 15a shows an embodiment of a scrubber disc in accordance with the invention having bristles arranged into tufts.

FIG. 15a shows an embodiment of a scrubber disc [135] in accordance with the invention having bristles arranged into radial arrays of tufts and having a polygonal central orifice [225.] All bristles are preferably cut to length in the same plane so that the outermost tufts have the longest bristles and the innermost tufts have the shortest bristles. The plane defined by the ends of all sets of tufts defines the scrubbing surface of the scrubber disc. Because each bristle is a cantilever beam, the longest beams around the rim are the most pliant, and the shortest closest to the hub are the stiffest. A three-tiered disc face thus presents tuft sets [135a,] [135b,] and [135c] which become softer as they progress toward the rim.

This arrangement offers two advantages: the first being that outer tufts turn at a faster angular velocity and if made as stiff as the more central tufts, the outer ones would deleteriously pick up most of the burden of retarding torque of the cleaning action of the tufts as they hit the scissor blade and ride up the rake angle of its narrow cutting face. The second advantage is that pruners used to cut plants which exude gummy sap tend to acquire more of the residue at their blade tips, which end up closest to the scrubber disc hubs, so that most of the cleaning power is required at the center hub or helical scrubber. Softer peripheral tufts help concentrate rotational cleaning power to those regions of the scrubbing system in contact with where the pruners are most fouled and need the most cleaning action.

Figure 15B:
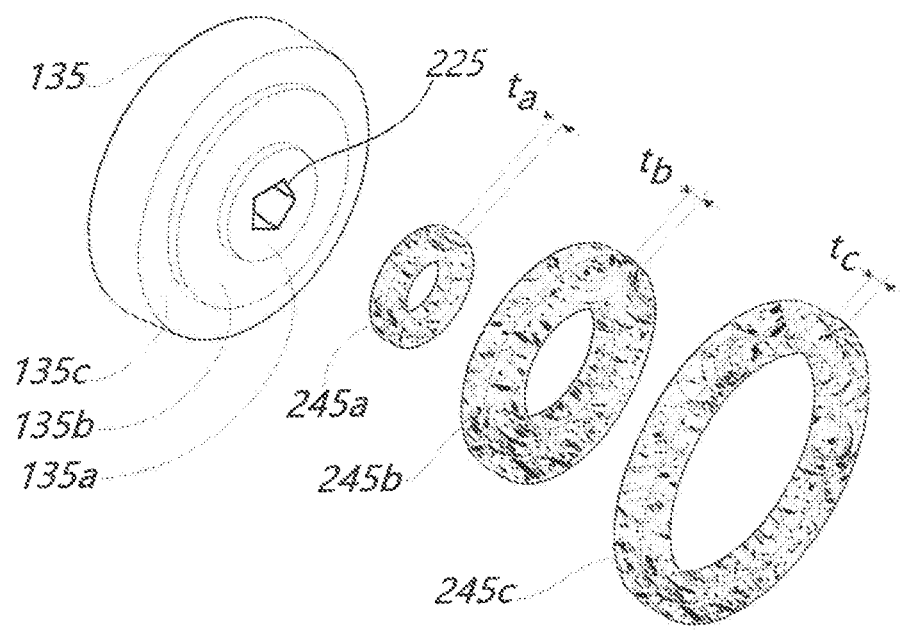
FIG. 15b shows another alternative construction for a scrubber disc in accordance with the invention.

FIG. 15b shows another alternative construction for a scrubber disc in accordance with the invention. A scrubbing medium for the pruner cleaning machine may comprise a plurality of bristles or may comprise one or more pads of cancellous or elastomeric material. In this figure the scrubber disc [135] has central polygonal aperture [225] which is a pentagon and a plurality of concentric tiered annular surfaces [135a, 135b, 135c] and concentric rings of replaceable scrubbing mediums are affixed to these tiered surfaces using an adhesive. The ring mediums [245a, 245b, 245c] are made in increasing thicknesses [$t_a$, $t_b$, $t_c$] as they progress from the hub to the rim, so that the outward facing surfaces of the replaceable ring mediums are substantially coplanar. The coplanar surfaces of the ring mediums define the scrubbing surface of this embodiment of a scrubber. Scrubbers having two or more tiers may be fashioned in accordance with the invention though in this figure three tiers are shown.

A typical scrubbing or scouring medium is created with a sparse unwoven polymer such as cellulose, nylon or spun polypropylene fiber, which is then impregnated with use hardening and abrasive materials such as aluminum oxide (alumina) or titanium dioxide, and bound to the fibers with a resin such as epoxy resins. Although the base polymers remain soft and compliant, their composition with the other materials greatly enhances abrasiveness.

The tiered thicknesses of scouring ring mediums may be sufficient for a set of ring mediums to exhibit increasing softness as they progress from the center to the rim, or alternatively rings may be created using softer strands or softer coating on the strands to effect the progressive softness of the assembly. As with the progressively compliant tufts, a system of progressively compliant concentric rings helps transmit torque more evenly across the entire system. Rings are detached and replaced as they wear out in the machine. Although adhesive is probably the simplest means of adhesion, mechanical fasteners and interlocking features are also contemplated within the scope of the invention, such as sets or radial arrays of pegs molded into a scouring ring which press fit or twist lock into apertures in the scrubber disc.

While certain features and aspects have been described with respect to exemplary embodiments, one skilled in the art will recognize that numerous modifications are possible. Further, while various methods and processes described herein may be described with respect to particular structural and/or functional components for ease of description, methods provided by various embodiments are not limited to any particular structural and/or functional architecture. Unauthorized instances of apparatuses and methods claimed herein are to be considered infringing, no matter where in the world they are advertised, sold, offered for sale, used, possessed, or performed.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

Hence, while various embodiments are described with or without certain features for ease of description and to illustrate exemplary aspects of those embodiments, the various components and/or features described herein with respect to a particular embodiment may be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A scrubber rotor assembly comprising
a shaft having a first end,
two scrubber disc assemblies each of said assemblies defining a scrubbing face, with at least one of said scrubber disc assemblies comprising
a scrubber disc having a central aperture, helical ramp, a step face at an end of said helical ramp, and a scrubbing medium,
a spindle, and
a shaft clamp, and
a helical scrubber residing coaxially upon said shaft between said scrubber disc assemblies, with said scrubber disc assemblies arranged on said shaft with their scrubbing faces facing each other.

2. The scrubber rotor assembly of claim 1, wherein said helical scrubber defines a helical contour and further comprises a plurality of bristles oriented within 20° of perpendicular to said helical contour.

3. The scrubber rotor assembly of claim 1, wherein said helical scrubber further comprises a plurality of bristles clenched between radially extending walls.

4. The scrubber rotor assembly of claim 3, wherein said radially extending walls extend from a channel further comprising a floor, with said helical scrubber further comprising a spline member received within said channel, and with said plurality of bristles passing between said spline and said floor.

5. The scrubber rotor assembly of claim 1, wherein said helical scrubber further comprises
cancellous material.

6. The scrubber rotor assembly of claim 1, wherein said scrubber disc further comprises cancellous material.

7. The scrubber rotor assembly of claim 1, wherein at least one scrubber disc assembly further comprises a spindle having a portion with a polygonal, exterior cross section complementary to said central aperture of said scrubber disc.

8. The scrubber rotor assembly of claim 1, wherein said shaft is a second shaft with its first end being convex, and further comprising a first shaft having a concave end into which said convex first end of said second shaft is received.

9. The scrubber rotor assembly of claim 1, further comprising a seal disposed between two half-housings to define a cleaning volume which contains at least one of said scrubber disc assemblies and said helical scrubber, and which further comprises a fluid ingress port and a fluid egress port.

10. The scrubber rotor assembly of claim 1, wherein an end face of said helical scrubber is in contact with said helical ramp of said scrubber disc.

11. The scrubber rotor assembly of claim 1, wherein said helical scrubber is in contact with said step face of said scrubber disc.

12. The scrubber rotor assembly of claim 1, further comprising a motor operably coupled to said shaft through a driving pulley, a drive belt, and a driven pulley.

13. The scrubber rotor assembly of claim 1, wherein said shaft is a second shaft further comprising a transverse pin, and with said scrubber rotor assembly further comprising a first shaft further comprising a transverse end slot into which said transverse pin is received.

14. The pruner cleaning apparatus of claim 1, wherein at least one of said scrubber disc assemblies further comprises tiered surfaces.

15. A pruner cleaning machine, comprising
first and second half-housings defining a cleaning volume with a seal disposed between said first and
second half-housings,
a first shaft at least partially residing within said cleaning volume,
a second shaft operably coupled to said first shaft, with said second shaft having a convex first end, and said first shaft having a concave end into which said convex first end of said second shaft is received,
two scrubber disc assemblies with each of said disc assemblies defining a scrubbing face, and with at least one of said scrubber disc assemblies further comprising a scrubber disc having a central aperture and a scrubbing medium,
a spindle, and
a shaft clamp, and
a helical scrubber residing coaxially upon said shaft between said scrubber disc assemblies, and with said scrubber disc assemblies arranged on said second shaft with their scrubbing faces facing each other.

16. The pruner cleaning machine of claim 15, wherein said helical scrubber defines a helical contour and further comprises a plurality of bristles oriented within 20° of perpendicular to said helical contour.

17. The pruner cleaning machine of claim 15, wherein said helical scrubber further comprises a plurality of bristles clenched between radially extending walls.

18. The pruner cleaning machine of claim 17, wherein said radially extending walls extend from a channel further comprising a floor, with said helical scrubber further comprising a spline member received within said channel, and with said plurality of bristles passing between said spline and said floor.

19. The pruner cleaning machine of claim 15, wherein said helical scrubber further comprises
cancellous material.

20. The pruner cleaning machine of claim 15, wherein said scrubber disc further comprises cancellous material.

21. The pruner cleaning machine of claim 15, wherein at least one scrubber disc assembly further comprises a spindle having a portion with a polygonal exterior cross section complementary to said central aperture of said scrubber disc.

22. The pruner cleaning machine of claim 15, wherein said second shaft further comprises a transverse pin, and said first shaft further comprises a transverse end slot into which said transverse pin is received.

23. The pruner cleaning machine of claim 15, wherein at least one of said scrubber disc assemblies further comprises tiered surfaces.

24. The pruner cleaning machine of claim 15, wherein said scrubber disc further comprises a helical ramp and a step face at an end of said helical ramp.

25. The pruner cleaning machine of claim 24, wherein an end face of said helical scrubber is in contact with said helical ramp of said scrubber disc.

26. The pruner cleaning machine of claim 24, wherein helical scrubber is in contact with said step face of said scrubber disc.

* * * * *